(12) United States Patent
Jakobsson et al.

(10) Patent No.: US 11,045,763 B2
(45) Date of Patent: Jun. 29, 2021

(54) PROCESS FOR TREATING THE OFF GAS FROM A CARBON BLACK PLANT TO RECOVER SULPHUR

(71) Applicant: Haldor Topsøe A/S, Kgs. Lyngby (DK)

(72) Inventors: Niklas Bengt Jakobsson, Kågeröd (SE); Peter Bo Olsen, Hørsholm (DK); Janus Emil Münster-Swendsen, Espergærde (DK)

(73) Assignee: Haldor Topsoe A/S, Lyngby (DK)

( * ) Notice: Subject to any disclaimer, the term of this patent is extended or adjusted under 35 U.S.C. 154(b) by 10 days.

(21) Appl. No.: 16/471,792

(22) PCT Filed: Jan. 25, 2018

(86) PCT No.: PCT/EP2018/051830
§ 371 (c)(1),
(2) Date: Jun. 20, 2019

(87) PCT Pub. No.: WO2018/138200
PCT Pub. Date: Aug. 2, 2018

(65) Prior Publication Data
US 2020/0188850 A1 Jun. 18, 2020

(30) Foreign Application Priority Data

Jan. 25, 2017 (DK) .......................... PA 2017 00052

(51) Int. Cl.
*C01B 17/04* (2006.01)
*B01D 53/14* (2006.01)
*B01D 53/86* (2006.01)

(52) U.S. Cl.
CPC ..... *B01D 53/8612* (2013.01); *B01D 53/1418* (2013.01); *B01D 53/1425* (2013.01);
(Continued)

(58) Field of Classification Search
CPC .. C09C 1/48; B01D 53/1468; B01D 53/8612; B01D 53/1456; B01D 53/1418;
(Continued)

(56) References Cited

U.S. PATENT DOCUMENTS 4,460,558 A * 7/1984 Johnson .................. C09C 1/487
23/314
4,519,992 A 5/1985 Alkhazov et al.
(Continued)

FOREIGN PATENT DOCUMENTS

CN 104249994 A 12/2014
EP 2 878 367 6/2015
(Continued)

OTHER PUBLICATIONS

"Design Handbook for Purification and Production of Coke Oven Gas", S. Fan, Ed., Metallurgical Industry Press, pp. 243-245, Jul. 2012.
(Continued)

*Primary Examiner* — Timothy C Vanoy
(74) *Attorney, Agent, or Firm* — Blank Rome LLP

(57) ABSTRACT

The present application relates to a process for treating the off gas from a carbon black process, said process comprising the steps of: providing an off gas from a carbon black process, reacting said off gas in a first reaction step forming water and S, and condensing the S at a temperature Tcon where S is in a liquid phase and the water is in gas form thereby achieving a gaseous stream comprising water and a liquid stream comprising S, and wherein the first reaction step is carried out over a monolith catalyst.

27 Claims, 4 Drawing Sheets

(52) U.S. Cl.
CPC ...... *B01D 53/1468* (2013.01); *C01B 17/0434* (2013.01); *B01D 2255/2092* (2013.01); *B01D 2255/20707* (2013.01); *B01D 2255/20738* (2013.01); *B01D 2255/20792* (2013.01); *B01D 2255/30* (2013.01); *B01D 2256/20* (2013.01)

(58) Field of Classification Search
CPC ...... B01D 2258/0283; B01D 2257/304; B01D 53/52; B01D 53/48; B01D 53/86; B01D 2257/30; C01B 17/0434; C01B 32/30; C01B 32/254; C01B 32/36; C01B 32/378; C01B 32/39; C01B 17/021; C01B 17/04
See application file for complete search history.

(56) References Cited

U.S. PATENT DOCUMENTS

| | | | | |
|---|---|---|---|---|
| 5,278,123 | A | * | 1/1994 | Chopin ................. C01B 17/508 502/200 |
| 5,700,440 | A | | 12/1997 | Li et al. |
| 6,056,936 | A | * | 5/2000 | Nougayrede .......... B01J 27/224 423/574.1 |
| 6,080,379 | A | * | 6/2000 | Nedez ................ B01D 53/8606 423/511 |
| 2003/0194366 | A1 | | 10/2003 | Srinivas et al. |
| 2005/0180914 | A1 | | 8/2005 | Keller et al. |
| 2009/0285738 | A1 | | 11/2009 | Winter et al. |
| 2010/0240135 | A1 | | 9/2010 | Seeger et al. |

FOREIGN PATENT DOCUMENTS

| | | |
|---|---|---|
| WO | WO 2006/108124 A2 | 10/2006 |
| WO | WO 2016/030495 A1 | 3/2016 |

OTHER PUBLICATIONS

"Desuifurization of Gases", V. Shi et al., Eds., pp. 246-248, Shanghai Scientific & Technical Publishers, May 1986.

"Smelting Technology for Calcination Pre-treatment of Gold Concentrate", J. Nan et al., Eds., pp. 230-231, Metallurgical Industry Press, Jan. 2010.

* cited by examiner

PROCESS FOR TREATING THE OFF GAS FROM A CARBON BLACK PLANT TO RECOVER SULPHUR

Soot is the common word for impure carbon particles resulting from the incomplete combustion of hydrocarbons. It is a powder-like form of amorphous carbon. The gas-phase soots contain polycyclic aromatic hydrocarbons (PAHs). Most properly it is restricted to the product of the gas-phase combustion process, but it is commonly extended to include the residual pyrolyzed fuel particles, such as coal, charred wood, petroleum coke, etc., which may become airborne during pyrolysis and which are more properly identified as cokes or chars.

Soot as an airborne contaminant in the environment has many different sources, all of which are results of some form of pyrolysis. They include soot from coal burning, internal combustion engines, power plant boilers, ship boilers, central steam heat boilers, waste incineration, local field burning, house fires, forest fires, fireplaces, furnaces, etc. The formation of soot depends strongly on the fuel composition. The rank ordering of the tendency of fuel components to produce soot is: naphthalenes→benzenes→aliphatics. This phenomenon is also known as cracking. How-ever, the order of sooting tendencies of the aliphatics (alkanes, alkenes, alkynes) varies dramatically depending on the flame type. The difference between the sooting tendencies of aliphatics and aromatics is thought to result mainly from the different routes of formation. Aliphatics appear to first form acetylene and polyacetylenes, which is a slow process; aromatics can form soot both by this route and also by a more direct pathway involving ring condensation or polymerization reactions building on the existing aromatic structure.

Carbon black is a specific variant of soot produced by the incomplete combustion of heavy petroleum products like tar, coal tar, ethylene cracking tar, and a small amount from vegetable oil. Carbon black is a form of paracrystalline carbon that has a high surface area-to-volume ratio, albeit lower than that of activated carbon. It is dissimilar to ordinary soot in its much higher surface area-to-volume ratio and significantly lower (negligible as well as non-bioavailable) PAH content. However, carbon black is widely used as a model compound for diesel soot for diesel oxidation experiments. Carbon black is mainly used as a reinforcing filler in tires and other rubber products. In plastics, paints and inks, carbon black is used as a color pigment.

Carbon black is virtually pure elemental carbon in the form of colloidal particles that are produced by incomplete combustion or thermal decomposition of gaseous or liquid hydrocarbons under controlled conditions. Its physical appearance is that of a black, finely divided pellet or powder. Its use in tires, rubber and plastic products, printing inks and coatings is related to properties of specific surface area, particle size and structure, conductivity and color. Carbon black is also in the top 50 industrial chemicals manufactured worldwide, based on annual tonnage. Approximately 90% of carbon black is used in rubber applications, 9% as a pigment, and the remaining 1% as an essential ingredient in hundreds of diverse applications.

Modern carbon black products are direct descendants of early "lamp blacks" first produced by the Chinese over 3,500 years ago. These early lamp blacks were not very pure and differed greatly in their chemical composition from current carbon blacks. Since the mid-1970s, most carbon black has been produced by the oil furnace process, which is most often referred to as furnace black.

Two carbon black manufacturing processes (furnace black and thermal black) produce nearly all of the world's carbon blacks, with the furnace black process being the most common. The furnace black process uses heavy aromatic oils as feedstock. The production furnace uses a closed reactor to atomize the feedstock oil under carefully controlled conditions (primarily temperature and pressure). The primary feedstock is introduced into a hot gas stream (achieved by burning a secondary feedstock, e.g., natural gas or oil) where it vaporizes and then pyrolyzes in the vapour phase to form microscopic carbon particles. In most furnace reactors, the reaction rate is controlled by steam or water sprays. The carbon black produced is conveyed through the reactor, cooled, and collected in bag filters in a continuous process. Residual gas, or tail gas, from a furnace reactor includes a variety of gases such as carbon monoxide and hydrogen. Most furnace black plants use a portion of this residual gas to produce heat, steam or electric power.

The thermal black process uses natural gas, consisting primarily of methane, or heavy aromatic oils as feedstock material. The process uses a pair of furnaces that alternate approximately every five minutes between pre-heating and carbon black production.

The natural gas is injected into the hot refractory lined furnace, and, in the absence of air, the heat from the refractory material decomposes the natural gas into carbon black and hydrogen. The aerosol material stream is quenched with water sprays and filtered in a bag house. The exiting carbon black may be further processed to remove impurities, pelletized, screened, and then packaged for shipment. The hydrogen off-gas is burned in air to preheat the second furnace.

Carbon black is not soot or black carbon, which are the two most common, generic terms applied to various unwanted carbonaceous by-products resulting from the incomplete combustion of carbon-containing materials, such as oil, fuel oils or gasoline, coal, paper, rubber, plastics and waste material. Soot and black carbon also contain large quantities of dichloromethane- and toluene-extractable materials, and can exhibit an ash content of 50% or more.

Carbon black is chemically and physically distinct from soot and black carbon, with most types containing greater than 97% elemental carbon arranged as aciniform (grape-like cluster) particulate. On the contrary, typically less than 60% of the total particle mass of soot or black carbon is composed of carbon, depending on the source and characteristics of the particles (shape, size, and heterogeneity). In the case of commercial carbon blacks, organic contaminants such as polycyclic aromatic hydrocarbons (PAHs) can only be extracted under very rigorous laboratory analytical procedures (solvent extraction using organic solvents and high temperatures). However, these extracts, though they may be similar to those derived from soot, are unique, because carbon black extracts exist only in extremely small quantities. Water and body fluids are ineffective in removing PAHs from the surface of carbon black and, therefore, they are not considered to be biologically available. Two other commercial carbonaceous products often confused with carbon black are activated carbon and bone black. Each is produced by processes different from commercial carbon black and possesses unique physical and chemical properties.

This invention has its basis in carbon black production by the furnace black method. More specifically, it concerns the tail gas from carbon black production. Said tail gas typically leaves the bag filter at 180-260° C., and it is normally combusted in a CO boiler or incinerated, because this reducing gas cannot be sent directly to the atmosphere.

According to the present invention is provided a process for treating the off gas from a carbon black process, said process comprising the steps of Providing an off gas from a carbon black process Reacting said off gas in a first reactor forming water and S Condensing the S at a temperature $T_{con}$ where S is in a liquid phase and the water is in gas form thereby achieving a gaseous stream comprising water and a liquid stream comprising S.

I.e. by the present process $H_2S$ in the off gas may be recovered as a commodity which can be used or sold instead of e.g. being combusted together with the overall off gas stream.

In advantageous embodiments the condensation temperature $T_{con}$ is in the interval between the dew point of water and the dew point of elemental Sulfur. Preferably the condensation is carried out at atmospheric pressure. It should be noted that in industrial applications considered to be carried out at atmospheric pressure it is well known that a slight over/under pressure of e.g. few mbar such as 1-100 mbar may be applied in order to ensure flow through the system.

The composition of the carbon black off gas may e.g. be 1-15% CO, 1-15% $H_2$, 0.1-5% $CO_2$, 50-5000 ppm $H_2S$, 15-40% water, balance $N_2$. For example, the composition of the carbon black off gas can be 10% CO, 10% $H_2$, 2% $CO_2$, 2000 ppm $H_2S$, 25% $H_2O$, $N_2$ to balance.

Depending on e.g. the feedstock used in the carbon black production and the conditions for the combustion the carbon black off gas may also comprise $SO_2$, $CS_2$, COS, $SO_3$.

The liquid stream containing S may be removed from the bulk gas stream in a condenser. The liquid stream containing S The liquid stream containing S preferably contains only sulphur and traces of gaseous components dissolved in the liquid sulphur such as traces of $H_2S$. The liquid sulphur has a vapour pressure of elemental sulphur which follows the bulk gas stream. The bulk gas stream may contain 10% CO, 10% $H_2$, 2% $CO_2$, 100 ppm $H_2S$, 150 ppm SO2, 300 ppm S vapour (as S1) and 25% $H_2O$, $N_2$ to balance.

The reaction in the first reactor may be carried out at a O2 surplus in which case O2 may be present in the bulk gas stream.

Preferably O2 is added Upstream the first reactor in a stoichiometric amount according to the reaction $H_2S + 0.5O_2 \rightarrow S + H_2O$.

In cases where the carbon black off gas comprises sulphur compounds such as CS2 e.g. present as 10-2000 ppm and/or COS e.g. present as 10-500 ppm, it may be beneficial to hydrolyse said sulphur compounds to $H_2S$ in a hydrolysing step before the first reactor. The CS2 and COS may be converted over a hydrolysis catalyst according to the reactions $CS_2 + 2H_2O \Rightarrow 2H_2S + CO_2$ and $COS + H_2O \Rightarrow H_2S + CO_2$. Preferably all the sulfur compounds in the carbon black off gas is converted into $H_2S$.

In advantageous embodiments the water needed according to the above reactions is present in the carbon black off gas, but may otherwise be added if needed.

The hydrolysis catalyst may for example be a TiO2 catalyst or an alumina such as Al02. The temperature in the hydrolysis step may e.g. be 180-300° C. Furthermore, the hydrolysis step may advantageously be carried out at substantially the same pressure as the subsequent first reactor.

A suitable reactor for the first reaction step may be a direct oxidation reactor wherein the off gas stream is reacted in a first reaction step preferably over a catalyst designed in order for the backwards reaction is not enhanced by a high water content. The catalyst may for example be a Fe on silica based catalyst. The catalyst may further comprise Na e.g. as $Na_2O$, Cl and/or Zn.

The carbon black off gas may contain residual particulates that have slipped through the bag house filter unit. The level of particulate matter may be in the range of 0.001-0.03% (w/w), such as 0.005-0.01% (w/w) and this level may provide challenges with respect to increased pressure drop and plugging of the reactor.

For this reason, it is preferred that the catalyst is of monolithic shape to allow the particulates to pass through the reactor.

The monolith can be corrugated from sheet metal or fiber glass web or extruded. Hydraulic diameter can be in the range of 1 mm to 10 mm and wall thickness can be from 0.1 mm to 1.5 mm.

The reactor can be equipped with soot blowing and removal systems such as sonic horns, high pressure air jet cleaning or traversing air-knife solutions as applied in traditional power plant exhaust cleaning systems where SCR catalyst are cleaned from particulates.

The gaseous stream from the condensation step may be provided to a CO boiler or e.g. a gas engine for heat and power production as known in the art. However by application of the present method, the gaseous stream is now sufficiently low in $H_2S$ in order to comply with environmental requirements and down-stream equipment specifications.

Alternatively, the gaseous stream from the first reactor and condensation step may be fed to a hydrogenation reactor wherein residual Sulphur vapour and/or $SO_2$ is hydrogenated to $H_2S$ for example at a temperature around 200 C. In various embodiments the hydrogenation takes place in the gas mixture as it is.

The effluent stream from the hydrogenation reactor may comprise CO, $H_2$, $CO_2$, $H_2S$, $H_2O$, $N_2$ to balance.

As a further alternative or additional step the gaseous stream from the first reactor and condensation step may be fed to a wet scrubber where it is washed with water or a caustic solution to remove Sulphur particulates, $SO_2$ and $H_2S$.

At least part of the effluent from the hydrogenation reactor may be treated in a $H_2S$ absorption unit obtaining a substantially $H_2S$ free stream.

Amine based absorption is common in liquid phase $H_2S$ absorption but can also be applied in sold phase adsorption. In these cases, the amine is typically regenerated using steam at elevated temperatures above 100 C and the sulfur leaves the amine as $H_2S$.

If only part of the effluent from the hydrogenation step is treated in the $H_2S$ absorption unit a bypass may be provided to lead the remaining effluent from the hydrogenation step around the $H_2S$ absorption unit.

Depending on the requirements of the plant and downstream processes the bypass and the substantially $H_2S$ free stream may be mixed or separately treated downstream.

Preferably the $H_2S$ absorption unit is regenerative. The regeneration may be provided under low $O_2$ conditions or in an oxidation process. At low $O_2$ conditions the regeneration off gas may comprise $H_2S$ and may e.g. be recycled upstream the first reactor.

Alternatively, in case of an oxidation process the regeneration off gas may comprise $SO_2$ in which case the regeneration off gas e.g. may be fed to a WSA process.

For regenerative $H_2S$ adsorption with solid sorbents the sorbent is typically regenerated at 200-400 C (atmospheric pressure) with nitrogen, air or steam or mixtures thereof.

Thus according to the present process is provide a way to eliminate $H_2S$ from the carbon black off gas in a way which not only removes $H_2S$ for environmental reasons but recovers the Sulphur as on or more commodities.

DETAILED DESCRIPTION OF THE PREFERRED EMBODIMENTS

Figure 1:
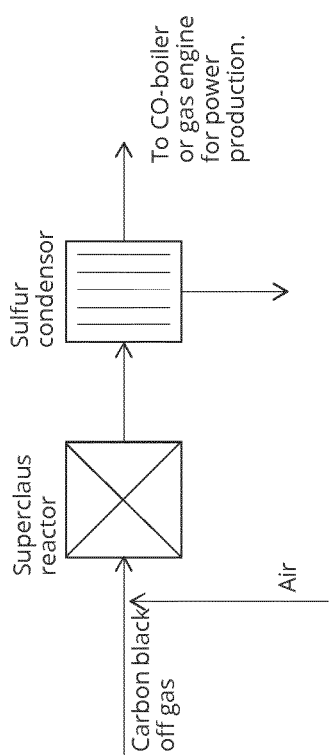
FIG. 1 shows a first embodiment of the present invention.

FIG. 1 The carbon black off gas exits the bag filter at 180-260 C and is mixed with air fed directly to the first reactor. The reaction $H_2S+0.5O_2 \rightarrow S+H_2O$ is catalysed and elemental sulfur is formed. The elemental sulphur is condensed in the Sulphur condenser at a temperature where the sulphur is still in the liquid phase but the water content in the gas stream is still in the vapour form. The gas from the condenser is then fed to a CO boiler or gas engine for heat and power production.

Figure 2:
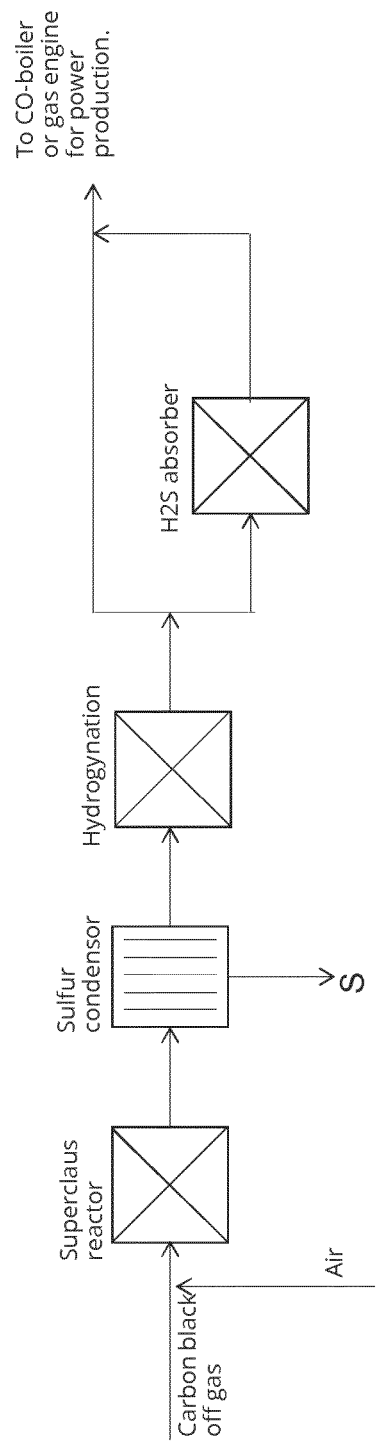
FIG. 2 shows a second embodiment of the present invention.

FIG. 2 The carbon black off gas exits the bag filter at 180-260 C and is mixed with air fed directly to the first reactor. The reaction $H_2S+0.5O_2 \rightarrow S+H_2O$ is catalysed and elemental sulfur is formed. The elemental sulphur is condensed in the Sulphur condenser at a temperature where the sulphur is still in the liquid phase but the water content in the gas stream is still in the vapour form. The gas from the condenser is then fed to a hydrogenation reactor where residual elemental sulfur vapour and $SO_2$ is hydrogenated to $H_2S$ around at 200 C and a part of the gas stream is led to a $H_2S$ absorption unit where the gas is further purified and depending on the gas purity required downstream is led directly (or after mixing with the bypass stream) to a CO boiler or gas engine for heat and power production.

Figure 3:
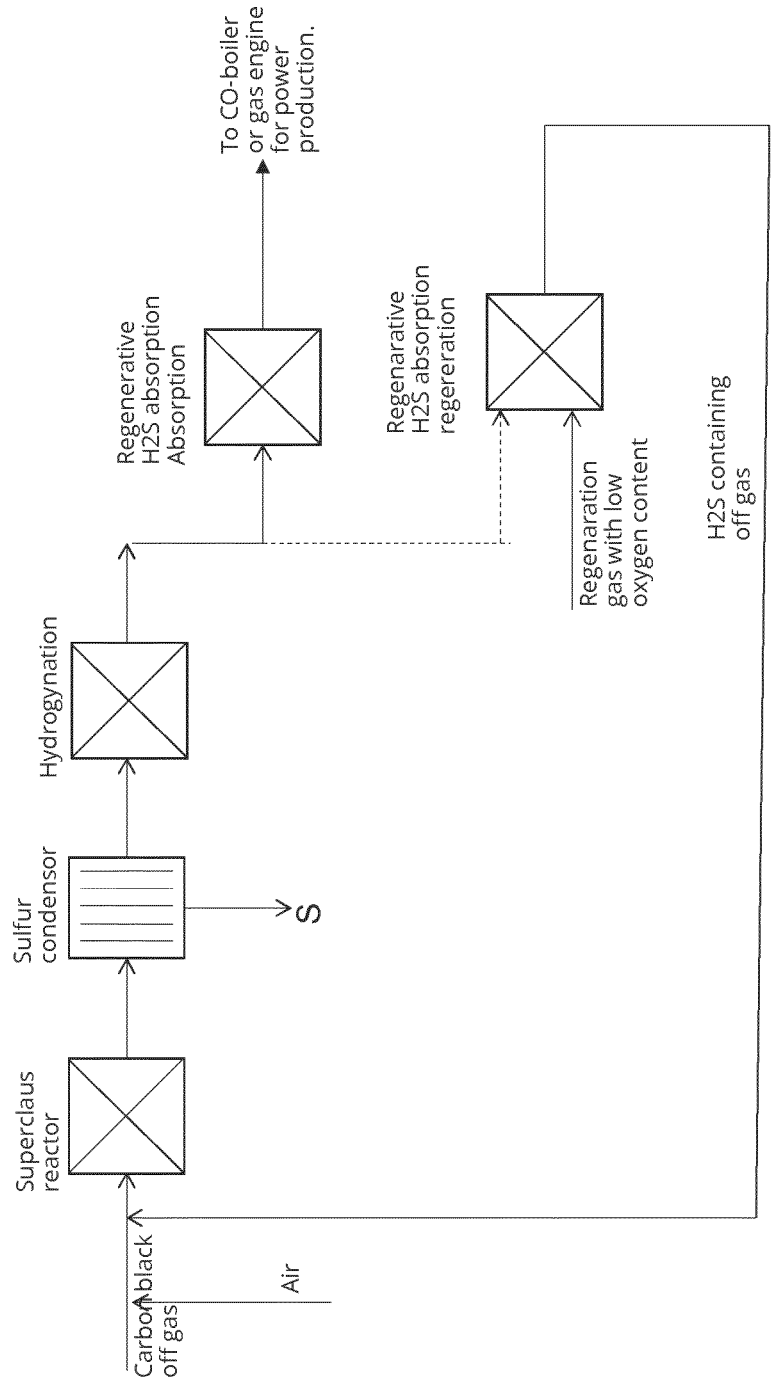
FIG. 3 shows a third embodiment of the present invention.

FIG. 3 The carbon black off gas exits the bag filter at 180-260 C and is mixed with air fed directly to the first reactor. The reaction $H_2S+0.5O_2 \rightarrow S+H_2O$ is catalysed and elemental sulphur is formed. The elemental sulphur is condensed in the Sulphur condenser at a temperature where the sulphur is still in the liquid phase but the water content in the gas stream is still in the vapour form. The gas from the condenser is then fed to a hydrogenation reactor at around 200 C where residual elemental sulphur vapour and $SO_2$ is hydrogenated to $H_2S$ and a part of the gas stream is led to a $H_2S$ absorption unit where the gas is further purified. The $H_2S$ absorption unit is regenerative and the regenerated off gas containing $H_2S$ is routed back upstream from the first reactor to a CO boiler or gas engine for heat and power production.

Figure 4:
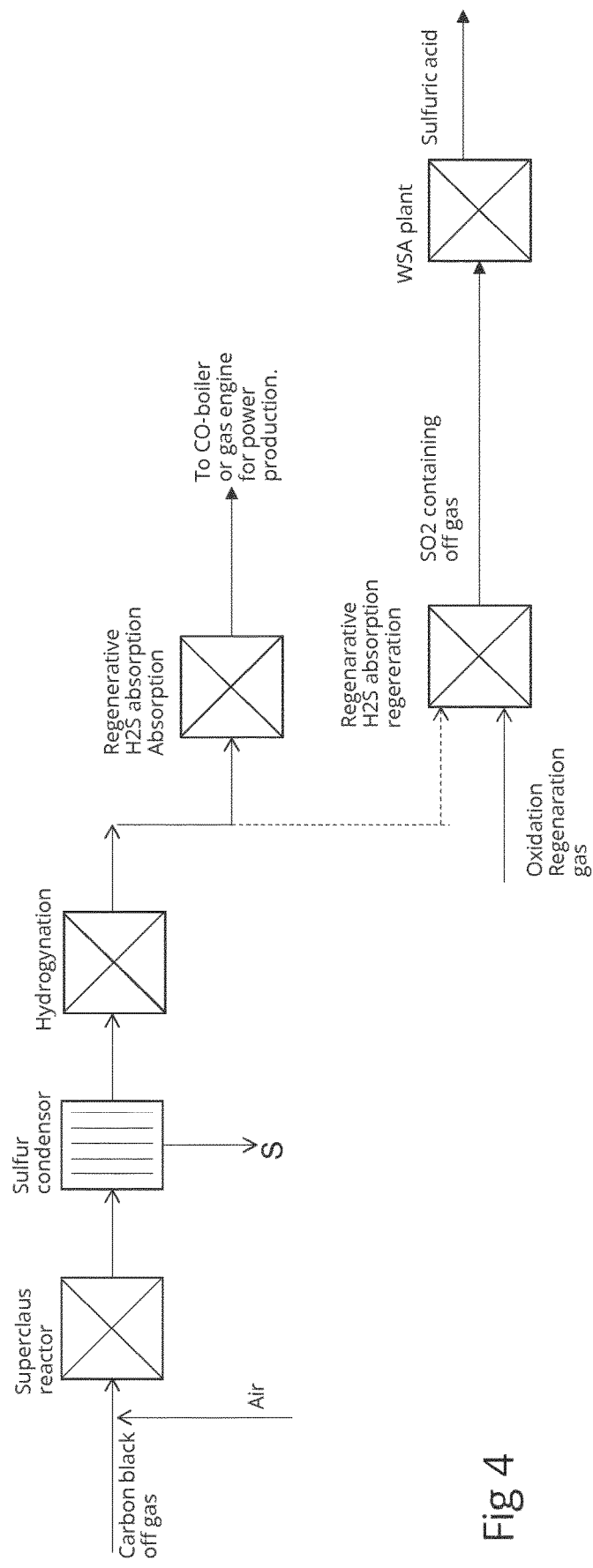
FIG. 4 shows a fourth embodiment of the present invention.

FIG. 4 The carbon black off gas exits the bag filter at 180-260 C and is mixed with air fed directly to the first reactor. The reaction $H_2S+0.5O_2 \rightarrow S+H_2O$ is catalysed and elemental sulphur is formed. The elemental sulphur is condensed in the Sulphur condenser at a temperature where the sulphur is still in the liquid phase but the water content in the gas stream is still in the vapour form. The gas from the condenser is then fed to a hydrogenation reactor where residual elemental sulphur vapour and $SO_2$ is hydrogenated to $H_2S$ around 200 C and a part of the gas stream is led to a $H_2S$ absorption unit where the gas is further purified. The $H_2S$ absorption unit is regenerative and the regenerated in a manner where the outlet gas is converted to $SO_2$ which is further converted to sulfuric acid in for example a WSA plant. The purified gas is led to a CO boiler or gas engine for heat and power production.

Depending on the composition of the carbon black off gas each of the embodiments according to FIGS. 1 to 4 may further be arranged to hydrolyse one or more sulphur compounds to $H_2S$ in a hydrolysing step before the first reactor.

The invention claimed is:
1. A process for treating off gas from a carbon black process, said process comprising the steps of:
providing an off gas from a carbon black process;
reacting said off gas in a first reaction step forming water and S; and
condensing the S at a temperature $T_{con}$ where S is in a liquid phase and the water is in gas form thereby achieving a gaseous stream comprising water and a liquid stream comprising S,
wherein the first reaction step is carried out over a monolith catalyst at an inlet temperature of 180-250° C.
2. Process according to claim 1, wherein the monolith catalyst is corrugated from sheet metal or fiber glass web or is extruded.
3. Process according to claim 1, wherein the condensation temperature $T_{con}$ is in the interval between the dew point of water and the dew point of elemental Sulfur.
4. Process according to claim 1, wherein, the condensation is carried out at atmospheric pressure.
5. Process according to claim 1, wherein the composition of the carbon black off gas is 1-15% CO, 1-15% $H_2$, 0.1-5% $CO_2$, 50-5000 ppm $H_2S$, 15-40% water, balance $N_2$.
6. Process according to claim 1, wherein the carbon black off gas comprises 10-2000 ppm $CS_2$ and/or 10-500 ppm COS.
7. Process according to claim 1, comprising a hydrolysis step upstream the first reactor.
8. Process according to claim 1, wherein $O_2$ and/or air is added upstream the first reaction step in a stoichiometric amount according to the reaction $H_2S+0.5O_2 \rightarrow S+H_2O$.
9. Process according to claim 1, wherein the monolith catalyst comprises oxides of Fe, Cr and/or Zn based on alumina and/or or Silica carriers optionally promoted by $Na_2O$.
10. A process for treating off gas from a carbon black process, said process comprising the steps of:
providing an off gas from a carbon black process;
reacting said off gas in a first reaction step forming water and S; and
condensing the S at a temperature $T_{con}$ where S is in a liquid phase and the water is in gas form thereby achieving a gaseous stream comprising water and a liquid stream comprising S,
wherein the first reaction step is carried out over a monolith catalyst, and wherein the gaseous stream comprising water from the condensation step is reacted in a hydrogenation step.
11. Process according to claim 10, where the hydrogenation is carried out over a catalyst comprising Ni, Co and/or Mo on an alumina carrier.
12. Process according to claim 10, wherein the hydrogenation may comprise an oxidation step.
13. Process according to claim 10, wherein the hydrogenation takes place in the gas mixture as it is or alternatively with $H_2$ added.

14. Process according to claim 10, wherein the effluent stream from the hydrogenation reactor may comprise CO, $H_2$, $CO_2$, $H_2S$, $H_2O$, $N_2$ to balance.

15. Process according to claim 10, wherein at least part of the effluent from the hydrogenation reactor is treated in a $H_2S$ absorption unit, obtaining a substantially $H_2S$ free stream.

16. Process according to claim 15, wherein at least part of the effluent from the hydrogenation reactor bypasses the $H_2S$ absorption step as a bypass stream.

17. Process according to claim 15, wherein the bypass stream and the substantially $H_2S$ free stream may be mixed or separately treated downstream.

18. Process according to claim 15, wherein the $H_2S$ absorption unit is regenerative.

19. Process according to claim 18, wherein the regeneration is carried out under low $O_2$ conditions.

20. Process according to claim 19, wherein, at low $O_2$ conditions, the regeneration off gas comprises $H_2S$, and the regeneration off gas comprising $H_2S$ is recycled upstream the first reactor.

21. Process according to claim 18, wherein the regeneration is an oxidation process, wherein the regeneration off gas comprises $SO_2$, and wherein the regeneration off gas comprising $SO_2$ is fed to a WSA process.

22. A plant arranged to carry out the process according to claim 1, comprising a hydrogenation reactor wherein water from the condensation step is reacted.

23. Plant according to claim 22, further comprising a first reactor comprising a monolith catalyst for reacting a carbon black off gas to water and S, and a condensation step downstream the first reactor.

24. Plant according to claim 23, wherein the monolith catalyst comprises oxides of Fe, Cr and/or Zn based on alumina and/or or silica carriers optionally promoted by $Na_2O$.

25. Plant according to claim 22, wherein said hydrogenation reactor comprises a catalyst comprising Ni, Co and/or Mo on an alumina carrier.

26. Plant according to claim 22, wherein said hydrolysis reactor is upstream the first reactor, and wherein said hydrolysis reactor comprises at least one catalyst comprising $TiO_2$ and/or alumina.

27. Plant according to claim 22, further comprising a $H_2S$ absorption unit.

* * * * *